(12) United States Patent
Taguchi

(10) Patent No.: US 7,808,145 B2
(45) Date of Patent: Oct. 5, 2010

(54) ARMATURE IN ROTARY ELECTRIC DEVICE AND ITS MANUFACTURING METHOD

(75) Inventor: Masaki Taguchi, Kiryu (JP)

(73) Assignee: Mitsuba Corporation, Kiryu-shi (JP)

( * ) Notice: Subject to any disclaimer, the term of this patent is extended or adjusted under 35 U.S.C. 154(b) by 135 days.

(21) Appl. No.: 12/085,235

(22) PCT Filed: Nov. 20, 2006

(86) PCT No.: PCT/JP2006/323081

§ 371 (c)(1),
(2), (4) Date: May 20, 2008

(87) PCT Pub. No.: WO2007/060908

PCT Pub. Date: May 31, 2007

(65) Prior Publication Data

US 2009/0261681 A1      Oct. 22, 2009

(30) Foreign Application Priority Data

Nov. 22, 2005    (JP)    ............... 2005-336804

(51) Int. Cl.
*H02K 23/36*   (2006.01)
*H02K 15/08*   (2006.01)
*H02K 15/00*   (2006.01)

(52) U.S. Cl. ................ 310/179; 310/198; 310/195; 310/223; 310/224; 310/234

(58) Field of Classification Search ............... 310/198, 310/195, 233, 224, 234, 179, 223; *H02K 23/036, H02K 15/08, 15/00, 3/28*
See application file for complete search history.

(56) References Cited

U.S. PATENT DOCUMENTS

| | | | | |
|---|---|---|---|---|
| 5,654,602 A | * | 8/1997 | Willyoung | ............... 310/179 |
| 6,930,429 B2 | * | 8/2005 | Wang | ................... 310/225 |
| 7,274,126 B2 | * | 9/2007 | Walter et al. | ............ 310/225 |
| 7,619,344 B2 | * | 11/2009 | Osawa et al. | ........... 310/198 |
| 2006/0022544 A1 | * | 2/2006 | Kinashi | ................. 310/179 |
| 2006/0220489 A1 | | 10/2006 | Osawa et al. | |

FOREIGN PATENT DOCUMENTS

| | | |
|---|---|---|
| JP | A-06-070521 | 3/1994 |
| JP | A-2002-186210 | 6/2002 |
| JP | A-2002-305861 | 10/2002 |
| JP | A-2003-169458 | 6/2003 |
| JP | A-2005-269781 | 9/2005 |
| WO | WO 2005/036724 A1 | 4/2005 |

* cited by examiner

*Primary Examiner*—Quyen Leung
*Assistant Examiner*—Terrance Kenerly
(74) *Attorney, Agent, or Firm*—Oliff & Berridge, PLC

(57) ABSTRACT

An armature where at least one of a first winding wire and a second winding wire is wound around slots that are opposed to all magnetic poles serving as a same magnetic pole in a predetermined winding direction so as to correspond to a predetermined winding number as a total winding number between respective slots, so that the plurality of coils are formed, and a slot from which the first winding wire is led out and a slot into which the second winding wire is led are located circumferentially at both sides of commutator segments with which the first winding wire and the second winding wire are conductive.

8 Claims, 9 Drawing Sheets

ARMATURE IN ROTARY ELECTRIC DEVICE AND ITS MANUFACTURING METHOD

CROSS-REFERENCE TO RELATED APPLICATION

This application is the U.S. National Stage of PCT/JP2006/323081, filed Nov. 20, 2006, which claims priority from JP2005-336804, filed Nov. 22, 2005, the entire disclosure of which is incorporated herein by reference hereto.

BACKGROUND

The present disclosure relates to an armature in a rotary device and a method for manufacturing the same.

There exists a rotary device that includes a yoke in which magnetic poles are provided to an inner peripheral surface by a plurality of sets of permanent magnets and an armature in which a plurality of slots are formed to be axially long in an outer circumferential direction of a core and a plurality of coils are structured such that winding wires that are wound between slots at predetermined intervals are electrically conductive with adjacent commutator segments. When such an electric motor needs to have high torque and be downsized, the electric motor is multipolarized by increasing the number of sets of the permanent magnets, or the number of the commutator segments and the slots are increased so as to respond to the need. A magnetic imbalance, however, occurs when lap winding is carried out between commutator segments around and to which ends of a coil are wound and connected, and parts at which the coil is wound around, with the commutator segments and the parts being axially opposed substantially to each other. Centrifugal whirling is also generated because of torque ripple or the like.

In order to solve the problem, a proposed electric motor is constructed such that the number of the commutator segments is twice as many as the number of the slots. A first winding wire to be conductive with an arbitrary commutator segment and another commutator segment that is adjacent to the arbitrary commutator segment in a circumferential direction is wound in a forward-winding direction around slots that are opposed to a magnetic pole. A second winding wire to be conductive with the arbitrary commutator segment and another commutator segment that is adjacent to the arbitrary commutator segment in another circumferential direction is wound in a reverse-winding direction around slots that are opposed to another magnetic pole. The magnetic balance may thus be improved (see WO2005/036724, for example).

SUMMARY

The above conventional art will be constructed via subsequent winding-around steps. For example, a winding wire that is hooked around a (first) riser that is formed in a first commutator segment is wound in a forward-winding manner around slots that are opposed to a magnetic pole, so that a coil is formed. The winding wire is then led out from the slots so as to be hooked around a (second) riser of a second commutator segment. After that, the winding wire is led into between slots that are opposed to another magnetic pole so to be wound in a reverse-winding manner, so that another coil is formed. The winding wire is then led out of the slots so as to be hooked around a (third) riser of a third commutator segment.

Furthermore, in the conventional armature, the number of the commutator segments is twice as many as that of the slots. There may thus be a wide circumferential gap between the commutator segments from which the winding wire is led out and the slots around which the led-out winding wire is wound. The winding wire may thus be difficult to hook around the risers. As a result, the winding wires (so-called crossover) are congested between the commutator segments risers and the slots. The winding wires are also thickened. That is, to wind such wires must be difficult. Workability is thus decreased. In addition, the winding wires may overlap one another in the vicinity of the risers. As a result, there may be such defects as a fusing failure and a short-circuit of the coils. The present disclosure solves those problems as well as other problems and is also able to achieve various advantages.

The disclosure addresses an exemplary aspect of an armature in a rotary electric device that includes a yoke in which at least two sets of magnetic poles are provided, with the armature being pivotally supported by the yoke; and a plurality of coils that are circumferentially formed on the armature such that winding wires to be conductive with adjacent commutator segments are wound around between arbitrary slots a predetermined winding number. The number of the slots is half of the number of the commutator segments. A first winding wire to be conductive with an arbitrary commutator segment and another commutator segment that is adjacent in a circumferential direction of the arbitrary commutator segment is wound around in a forward-winding direction between slots that are opposed to a magnetic pole. A second winding wire to be conductive with the arbitrary commutator segment and another commutator segment that is adjacent in another circumferential direction of the arbitrary commutator segment is wound around in a reverse-winding direction between slots that are opposed to another magnetic pole. The coils are thus formed. At least one of the first and the second winding wires is wound around in a predetermined winding direction between slots that are opposed to all the same magnetic poles, so that a total winding number between the respective slots corresponds to the predetermined winding number. A slot from which the first winding wire is led out and a slot into which the second winding wire is led are circumferentially located at both sides of the commutator segments with which the first and the second winding wires are conductive.

In another exemplary aspect, the first winding wire and/or the second winding wire that is/are wound around between the slots that are opposed to all magnetic poles that serve as the same magnetic poles so as to form the plurality of coils are led around at an end that is opposite to a side at which the commutator segments of the slots are installed.

In another exemplary aspect, provided is a method for manufacturing an armature in a rotary electric device in which the armature is pivotally supported by a yoke in which at least two sets of magnetic poles are provided, wherein a plurality of coils are formed such that winding wires to be conductive with adjacent commutator segments are wound around a predetermined winding number between arbitrary slots, and the plurality of coils are circumferentially formed on the armature, and the method includes the steps of setting the number of the slots to be half of the number of the commutator segments; winding around a first winding wire in a forward-winding direction between slots that are opposed to a magnetic pole, with the first winding wire being conductive with an arbitrary commutator segment and another commutator segment that is adjacent in a circumferential direction of the arbitrary commutator segment; winding around a second winding wire in a reverse-winding direction between slots that are opposed to another magnetic pole, with the second winding wire being conductive with the arbitrary commutator segment and another commutator segment that is adjacent in another circumferential direction of the arbitrary commutator segment, so that the coils are formed; winding around in a predetermined winding direction at least one of the first and the second winding wires between slots that are opposed to all the same magnetic poles, with a total winding number between the respective slots being the predetermined winding number, so that the plurality of the coils are formed; and locating a slot from which the first winding wire is led out and a slot into which the second winding wire is led at circumferentially both sides of the commutator segments with which the first and the second winding wires are conductive.

In another exemplary aspect, the first winding wire and/or the second winding wire that is/are wound around between the slots that are opposed to all the same magnetic poles so as to form the plurality of coils are led around at an end that is opposite to a side at which the commutator segments of the slots are installed.

According to various exemplary aspects of the disclosure, not only are magnetic balances further improved, but also the winding wires are prevented from being congested among the commutator segments and the slots. The winding wires can thus simply and firmly be fixed to the commutator segments.

According to various exemplary aspects of the disclosure, the winding wires among the commutator segments and the slots are further prevented from being congested.

BRIEF DESCRIPTION OF THE DRAWINGS

Various embodiments of the disclosure will be described with reference to the drawings, wherein.

DETAILED DESCRIPTION OF EMBODIMENTS

Figure 1:
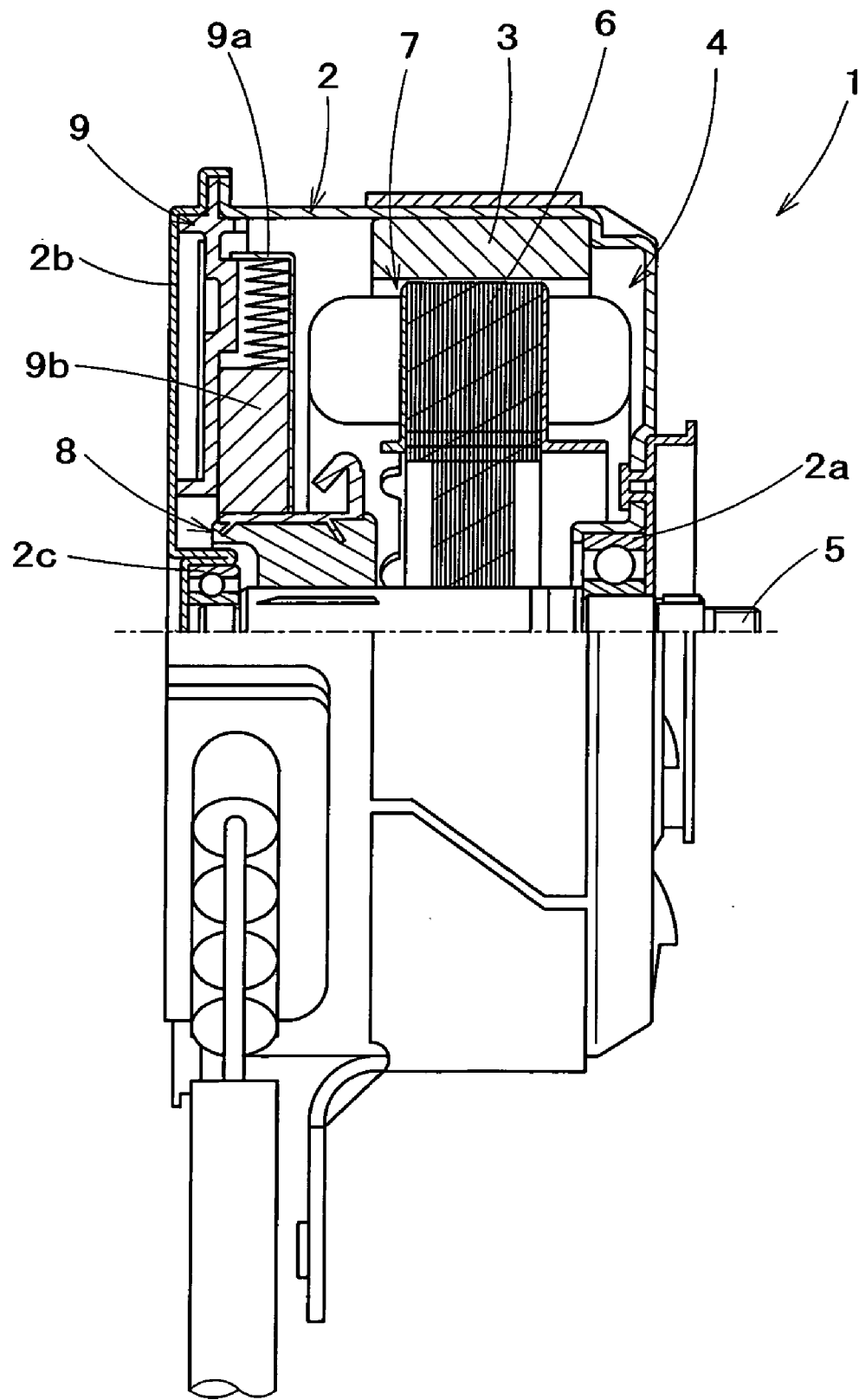
FIG. 1 is a partially cutaway sectional side view of an electric motor.

Next, a first embodiment of the present disclosure will be described with reference to the drawings. In FIG. 1, reference numeral 1 denotes an electric motor (rotary electric device) that serves as a driving source for electric components to be mounted on a vehicle. Permanent magnets 3 are fixed such that two sets of north and south poles are circumferentially formed to an inner peripheral surface of a bottomed tubular shaped yoke (motor housing) 2 of the electric motor 1. The electric motor 1 is thus structured so as to be a four-pole type electric motor in which the same poles are radially opposed to each other.

Reference numeral 4 denotes an armature that comprises an armature shaft 5 (see FIG. 1). At an outside of the armature shaft 5, integrally fitted is an armature core 7 that is formed such that a plurality of ring-shaped plate core materials 6 are laminated. A commutator (commutator segments) 8 is fixed at an outside of a leading end portion of the armature core 7. A base end of the armature shaft 5 is pivotally supported by the yoke 2 via a bearing 2a. The armature shaft 5 is thus inserted so as to be rotatable inside the yoke 2. A cover 2b is integrally provided on an open end of the yoke 2. A leading end portion of the armature shaft 5 is pivotally supported by a bearing 2c that is provided to the cover 2b.

A holder stay 9 is supported so as to be held between the cover 2b and the yoke 2 (see FIG. 1). Brush holders 9a are circumferentially formed at four places of the holder stay 9. Brushes 9b are installed so as to be freely risen and set in the respective brush holders 9a. When projecting leading end portions (inner diameter side leading end portions) of the brushes 9b elastically touch the commutator 8, an external power source is supplied to the commutator 8 via the brushes 9b. These basics are conventionally structured.

Figure 2A:
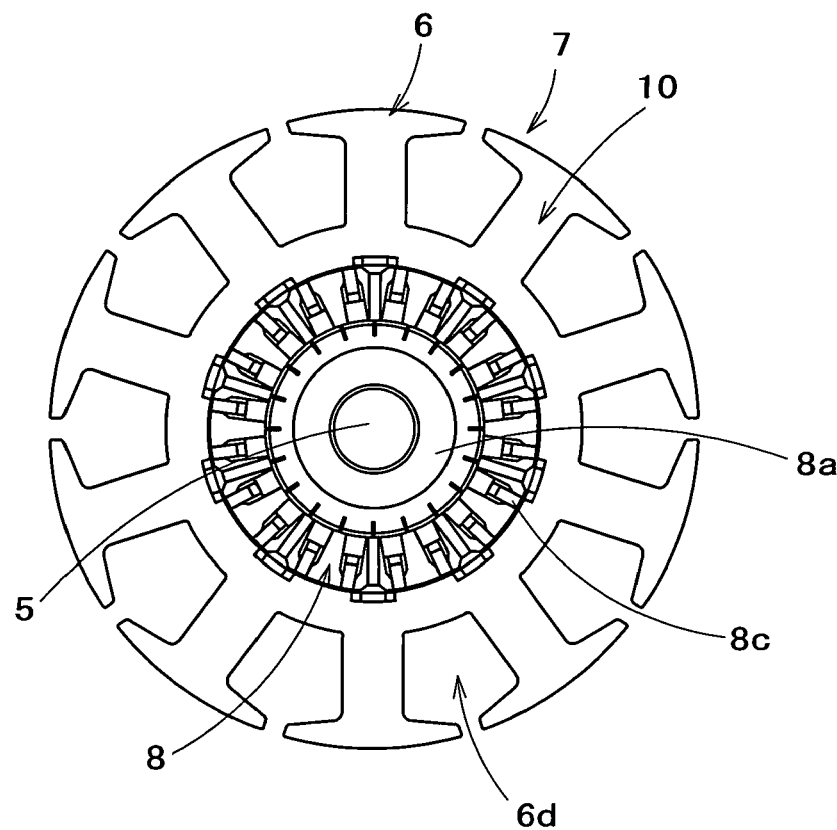
FIGS. 2A and 2B are respectively a front view and a side sectional view in a state in which coils are detached from an armature.
Figure 2B:
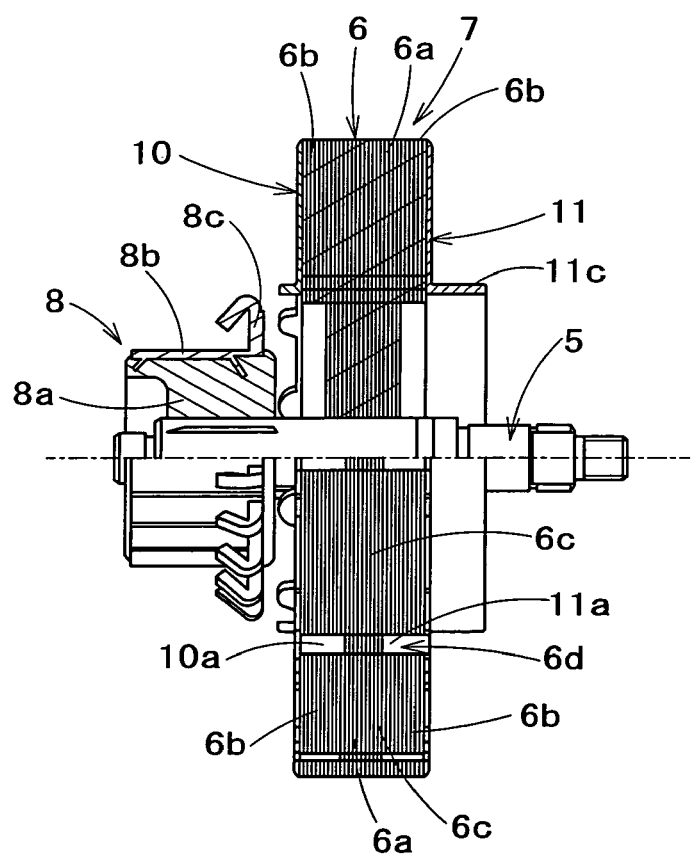

Two different types of the materials 6 of the armature core 7 are used (see FIG. 2B). First core materials 6a with an inner diameter is integrally fitted at an outside of the armature shaft 5. Second core materials 6b have an inner diameter that is greater than that of the first core materials 6a. The second core materials 6b are axially laminated on both ends of the first core material 6a. Void spaces are thus formed between inner diameter portions of the second core materials 6d and the armature shaft 5. Ten T-shaped teeth 6c are circumferentially formed respectively at outer peripheral portions of the first core materials 6a and the second core materials 6b (see FIG. 2A). Ten slots 6d in dovetail groove shapes that are provided in a recessed manner in a shaft center direction among adjacent teeth 6c are circumferentially formed so as to be axially long in outer periphery of the armature core 7 (see FIG. 2A).

Figure 3A:
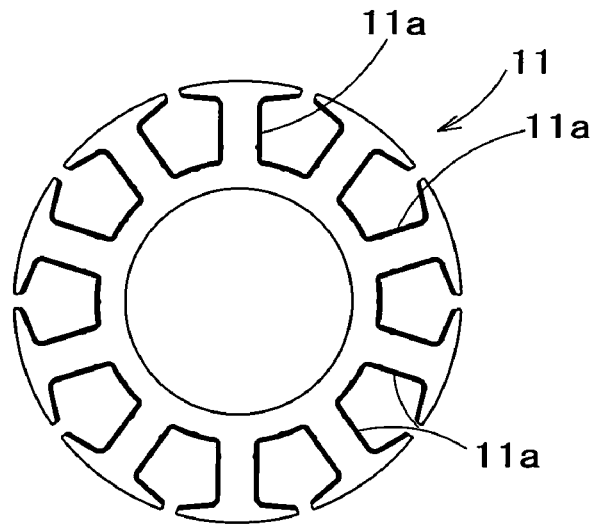
FIGS. 3A, 3B, and 3C are respectively a front view, a sectional view, and a rear view of an insulator at a base end side.
Figure 3B:
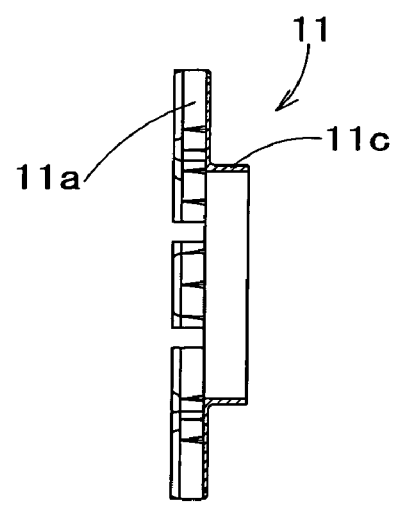
Figure 3C:
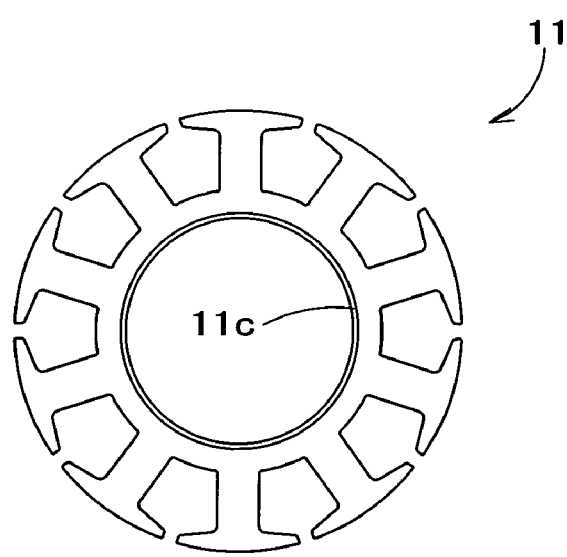

A pair of insulators 10 and 11 is integrally provided so as to be respectively located at an axial leading end side and a base end side of the armature core 7 (see FIG. 2B). The insulators 10 and 11 are formed so as to be substantially the same shape as shape of the second core materials 6b. Side members 10a and 11a are formed so as to be fitted at outsides of side members of the plural pieces of teeth 6c of the core materials 6. Moreover, of these insulators 10 and 11 in the present embodiment, base end side insulator 11 that is disposed along the second core material 6b that is located at an base end side that is opposite to a side of the commutator 8 is formed integrally with a tubular regulating piece 11c that extends so as to project toward the base end side (see FIGS. 2B, 3B, and 3C).

The commutator 8 is structured such that a plurality of commutator segments 8b that comprises conductive long plate materials are disposed circumferentially and parallel so as to insulate from each other at a peripheral surface of a ring-shaped body 8a that is fitted at an outside of the armature shaft 5 (see FIGS. 2A and 2B). Twenty pieces of the commutator segments 8b are provided, which is twice as many as the number of the slots 6d. The electric motor 1 thus includes four poles, ten pieces of the slots 6d, and twenty pieces of the commutator segments 8b. Risers 8c are formed at respective ends of a side of the armature core 7 of the commutator segments 8b. These respective risers 8c project in external diameter directions. Projecting end of the risers 8c is formed so as to be shaped and bent toward a side of the commutator 8 (see FIG. 2B).

The regulating piece 11c of the insulator 11, which is provided at the base end side of the armature core 7, is formed so as to face external diameter portions of the risers 8c of the commutator 8. As will be described later, when a coil 13 is formed such that a winding wire 12 is wound around the teeth 6c of the armature core 7, a crossover 14 among the slots 6d (the winding wire 12 that is led around among the slots 6d) is led around along the regulating piece 11c. The crossover 14 at a base end side of the armature shaft 5 is thus prevented from being led around a portion that faces the riser 8c (inner diameter side portion).

Between the slots 6d that are located at arbitrary places of the armature core 7 at predetermined intervals, the winding wire 12 that is coated with enamel is wound around through a winding-around procedure, which will be described later. Twenty pieces of the coils 13 are thus wound around an outer periphery of the armature core 7. The winding wire 12 that serves as a starting-point and an ending-point of the winding of the respective coils 13 is hooked around (hooked on) the risers 8c of the corresponding commutator segments 8b. The hooked-around ends of the starting-point and the ending-point of the winding wire 12 is then fused on portions of the risers 7c (hooked-around portions). Electric continuity is thus performed between the commutator segments 8b and the winding wire 12, i.e., between the corresponding coils 13.

Next, the winding-around procedure of the coils 13 will be described with reference to FIGS. 4, 5, and 6. First, a general lap winding is carried out to the armature 4, in which while twenty pieces of the commutator segments 8b are provided, ten pieces of the slots 6b, which is half the number of the commutator segments 8b, are provided. A pair of coils that is formed so as to be respectively conductive with commutator segments 8b that are adjacent to both sides of an arbitrary commutator segment by winding a wire around between the slots that interposes one slot therebetween. The pair of the coils is thus wound in one and the same winding-around direction. In the armature of the present disclosure, on the other hand, a pair of the coils 13, which is formed so as to be respectively conductive with commutator segments adjacent to both sides of an arbitrary commutator segment 8b, is configured such that one coil is wound around in a forward-winding direction, and another coil is wound around in a reverse-winding direction.

Figure 4:
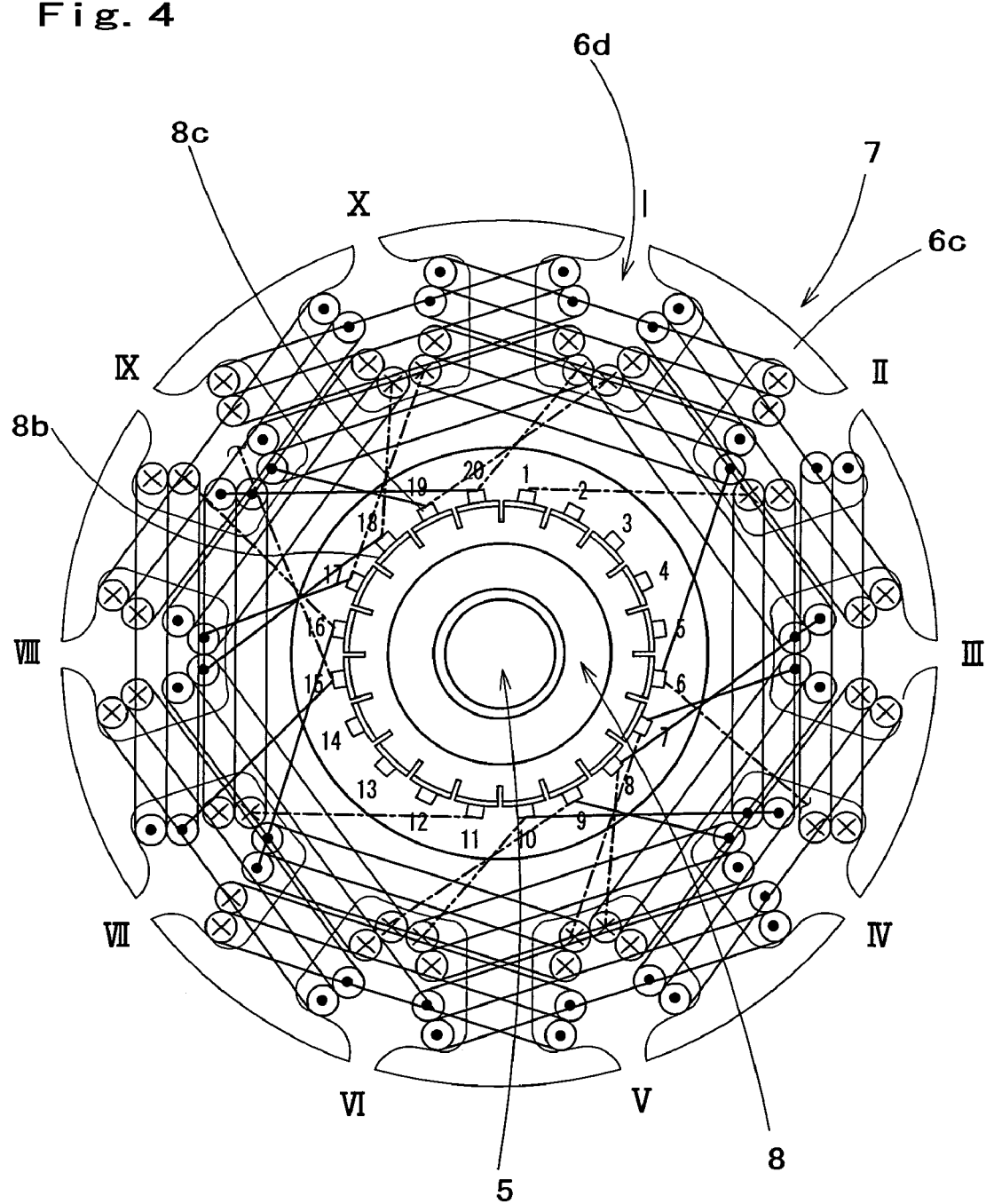
FIG. 4 is a front sectional view of an armature showing coils that are wound-around.

In FIG. 4, which illustrates a sectional view that shows a procedure for winding the winding wire 12 around the armature core 7, the winding directions of the winding wire 12 in the section of the coil 13 are indicated by dot (•) and cross (x) marks. The (•) mark indicates a winding-wire direction from a back side toward a front side in the drawing. The (x) mark indicates a winding-wire direction from a front side toward a back side in the drawing. Further, FIG. 5 illustrates a pattern explanatory diagram for a positional relationship between the coils 13 and the commutator segments 8b (risers 8c) that are conductive with the coils 13, where positions of the slots 6d, over which the winding wire 12 strides, are shown above symbols that show winding directions of the coils 13. Moreover, FIG. 6 illustrates a diagram in which the armature 4 is developed in order to explain a positional relationship between the commutator segments 8b, the slots 6d, and the coils 13. Void spaces between teeth 6c that are adjacent to another teeth 6c correspond to the slots 6d (see FIG. 6).

Figure 5:
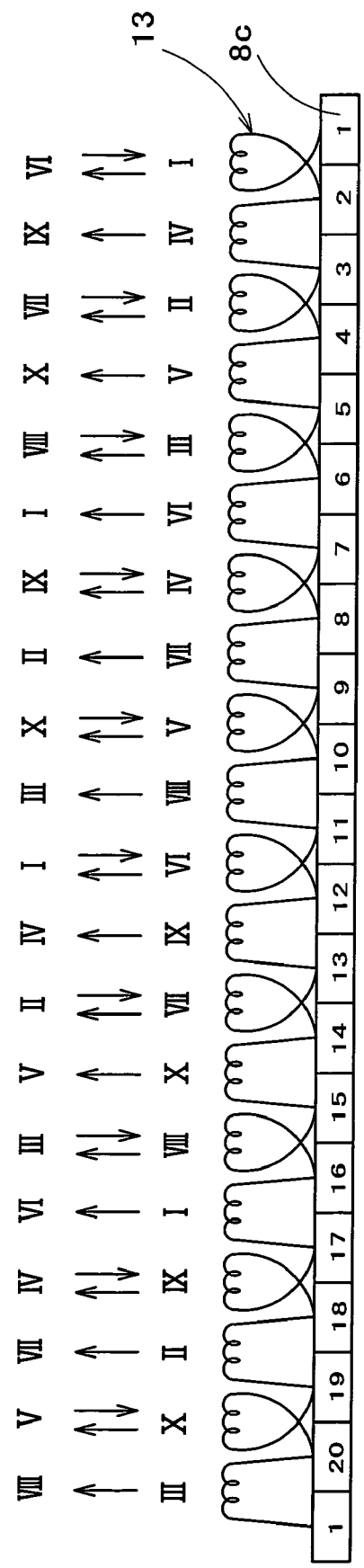
FIG. 5 is a development pattern explanatory diagram showing a positional relationship between coils and commutator segments.
Figure 6:
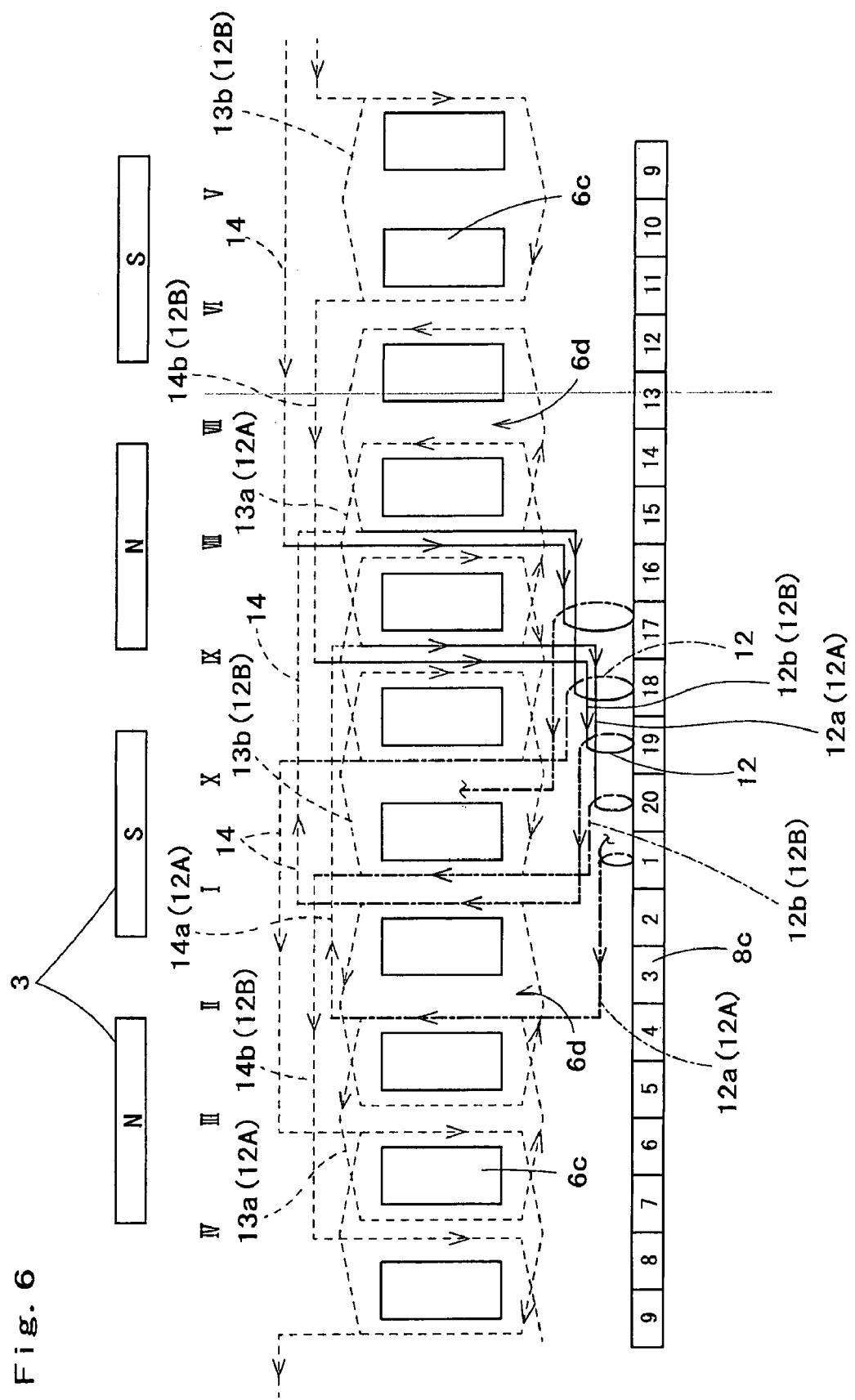
FIG. 6 is another development pattern explanatory diagram showing the positional relationship between the coils and the commutator segments.

In FIGS. 4, 5, and 6, numbers from 1 to 20 are assigned to the respective risers 8c, roman numerals from I to X are assigned to the respective slots 6d, and symbols based on numbers of the slots, over which the winding wire 12 respectively strides, are assigned to the twenty coils 13 to be wound.

The coils 13 to be wound around the armature 4 of the present embodiment are structured such that the winding wire 12 is wound a total winding number M between slots 6d that interposes another slot 6d therebetween. When a starting-point of the winding wire 12 is conductive with a first riser, the winding wire 12 that is hooked around the first riser 8c is wound so as to form a forward-winding IIIrd coil 13 by M/2-0.5 times when M is an odd number and M/2-1 or M/2 times when M is an even number between a IInd and a IVth slots 6d that interpose a IIIrd slot 6d therebetween.

The crossover 14 is then formed such that the winding wire 12 is led out of the IInd slot 6d to an axial base end side (of the armature shaft 5) (a side opposite to the commutator 8) and is led around from the IInd slot 6d to a base end side of a IXth slot 6d. The winding wire 12 is then is led out of the IXth slot 6d to an axial leading end side. Between the IXth and a VIIth slots 6d that interpose a VIIIth slot 6d there between, the winding wire 12 is wound-around M/2-0.5 times when M is an odd number, and M/2 or M/2-1 times when M is an even number so as to form a forward-winding VIIIth coil 13 that is located at a circumferential position that is diametrically opposed to the forward-winding IIIrd coil 13. The winding wire 12 is then led out of the IXth slot 6d to a leading end side so as to be hooked around a twentieth riser 8c.

Here, the winding wire 12 corresponds to a first winding wire 12A of the present disclosure such that the winding wire 12 is continuously led out of the first riser 8c to the IInd slot 6d, wound around between the IInd slot 6d and the IVth slots 6d so as to form the forward-winding IIIrd coil 13, wound around from the IInd slot 6d to the IXth slot 6d so as to form the crossover 14, wound around between the IXth slot 6d and the VIInd slot 6d so as to form the forward-winding VIIIrd coil 13, and wound around from the IXth slot 6d to the twentieth riser 8c. In particular, FIG. 6 illustrates the first winding wire 12A that includes a winding wire 12a that is led out of the first riser 8c to the IInd slot 6d; a winding wire 13a that forms the forward-winding IIIrd coil 13; a crossover 14a that is wound around from the IInd slot 6d to the IXth slot 6d; another winding wire 13a that forms the forward-winding VIIIrd coil 13; and another winding wire 12a that is wound around from the IXth slot 6d to the twentieth riser 8c.

Subsequently, the winding wire 12 that is led out of the twentieth riser is led into a Ist slot 6d. Between the Ist and a IXth slots 6d that interpose a Xth slot 6d therebetween, the winding wire 12 is then wound-around M/2-0.5 times when M is an odd number, and M/2-1 times when M is an even number, so that the reverse-winding Xth coil 13 is formed. After that, the winding wire 12 is led out to an axial leading end side of the Ist slot 6d and is led around from the Ist slot 6d to the base end side of the IXth slot 6d, so that the crossover 14 is formed. Between a IVth and a VIth slots 6d that interpose a Vth slot 6d therebetween, the winding wire 12 is then wound around M/2-0.5 times when M is an odd number, and M/2 times when M is an even number. A reverse-winding Vth coil 13 is then formed so as to be located at a circumferential position diametrically opposed to the reverse-winding Xth coil. The winding wire 12 that is led out to a base end side of a VIth slot 6d, which serves as the crossover 14, is led around to a side of the IXth slot 6d that structures the Xth coil 13. The winding wire 12 that is led out to a leading end side of the IXth slot 6d is hooked around the nineteenth riser 8c.

Here, the winding wire 12 corresponds to a second winding wire 12B of the present disclosure such that the winding wire 12 is continuously led out of the twentieth riser 8c to the Ist slot 6d, wound around between the Ist slot 6d and the IXth slot 6d so as to form the reverse-winding X the coil 13, wound around from the Ist slot 6d to the IVth slot 6d so as to form the crossover 14, wound around between the IVth slot 6d and the VIth slot 6d so as to form the reverse-winding Vth coil 13, wound around from the VIth slot 6d to the IXth slot 6d so as to form the crossover 14, and wound around from the IXth slot 6d to the nineteenth riser 8c. In particular, FIG. 6 illustrates the second winding wire 12B that includes a winding wire 12b that led out of the twentieth riser 8c to the Ist slot 6d; a winding wire 13b that forms the reverse-winding X the coil 13; a crossover 14b that is wound around from the Ist slot 6d to the IVth slot 6d; another winding wire 13b that forms the reverse-winding Vth coil 13; another crossover 14b that is wound around from the VIth slot 6d to the IXth slot 6d; and another winding wire 12b that is wound around from the IXth slot 6d to the nineteenth riser 8c.

By carrying out winding-around in this way, for example, when the permanent magnets 3 are faced with the forward-winding IIIrd coil 13 and the forward-winding VIIIth coil 13 that are conductive between the commutator segments 8c that are adjacent to one another in a circumferential direction (first and twentieth) on the basis of the twentieth riser 8c, then S poles are faced with the reverse-winding Xth coil and the reverse-winding Vth coil that are conductive between commutator segments 8c that are adjacent to one another in another circumferential direction (twentieth and nineteenth). When these coils 13 are supplied with electric power via the twentieth riser 8c, these coils 13 are excited so as to correspond to all the respective poles. Magnetic balances are thus further improved.

Figure 8:
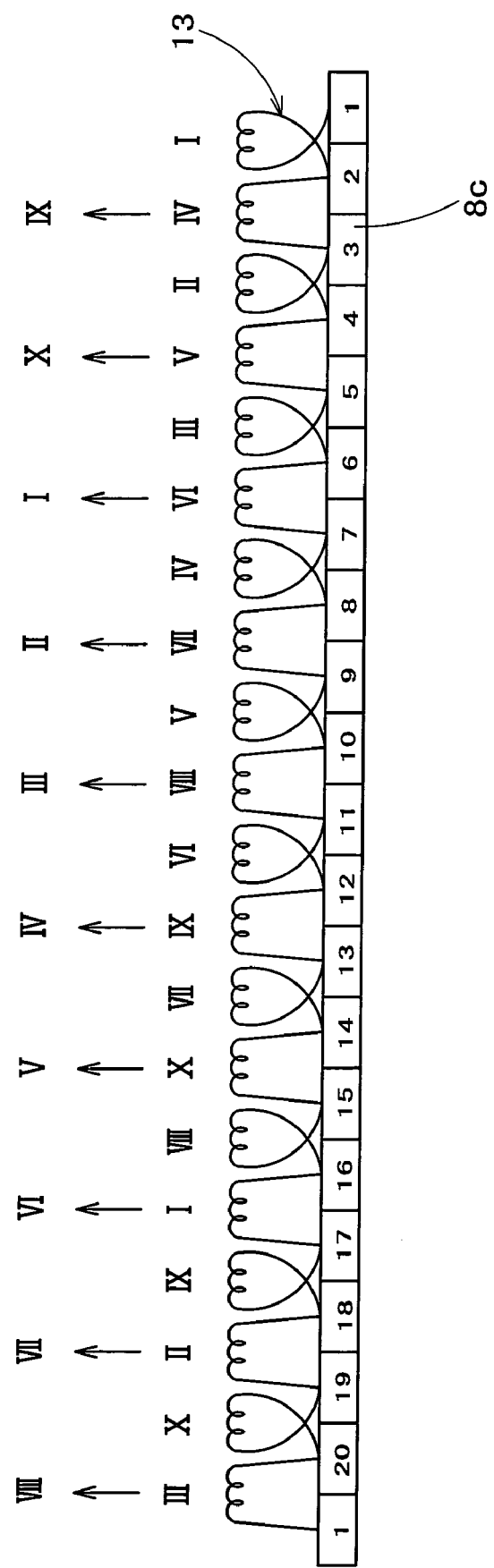
FIG. 8 is a development pattern explanatory diagram showing a positional relationship between the coils and commutator segments of the second embodiment.
Figure 9:
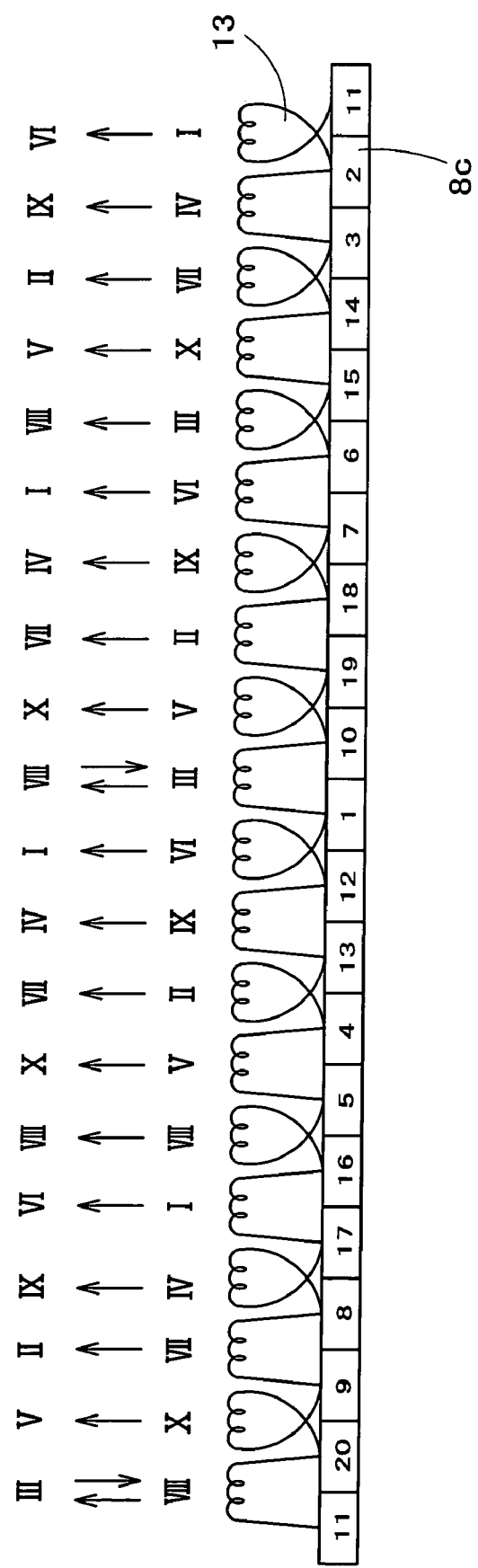
FIG. 9 is a development pattern explanatory diagram showing a positional relationship between coils and commutator segments of a third embodiment.

Moreover, the winding wire 12 that is led out of the nineteenth riser 8c forms the forward-winding IInd coil 13 and the forward-winding VIIth coil 13 and is led into (hooked on) the eighteenth riser 8c. The winding wire 12 that is led out of the eighteenth riser 8c forms the reverse-winding IXth coil 13 and the reverse-winding IVth coil 13. After returning to the reverse-winding IXth coil 13, the winding wire 12 is led into the seventeenth riser 8c. Subsequently, the winding wire 12 that is led out of the seventeenth riser 8c forms the forward-winding first coil 13 and the forward-winding VIth coil 13 and is led into the 16th riser 8c. The winding wire 12 that is led out of the sixteenth riser 8c forms the reverse-winding VIIIth coil 13 and the reverse-winding IIIrd coil 13. After returning to the reverse-winding VIIIth coil 13, the winding wire 12 is led into the fifteenth riser 8c. As described above, the coils 13 are wound around in the winding-around procedure as shown in FIG. 5. In addition, FIGS. 5, 8, and 9 show orders of forming the coils 13 by indicating the numbers of the coils 13 by using arrows above the pattern diagram illustrating the winding directions of the coils 13.

Double flyers are used in the present embodiment in order that the winding wire 12 is wound around the armature core 7. The winding wire 12 is hooked around the first riser 8c and the eleventh riser 8c with the winding wire 12 being symmetrical with respect to a point. The winding wire 12 that is led out of the eleven riser 8c forms the forward-winding VIIIth coil 13 and the forward-winding IIIrd coil 13 and is led into the tenth riser 8c. The winding wire 12 that is led out of the tenth riser 8c forms the reverse-winding Vth coil 13 and the reverse-winding Xth coil 13. After returning to the reverse-winding Vth coil 13, the winding wire 12 is led into the ninth riser 8c. Subsequently, the winding wire 12 that is led out of the ninth riser 8c forms the forward-winding VIIth coil 13 and the forward-winding IInd coil 13 and is led into the eighth riser 8c. The winding wire 12 that is led out of the eighth riser 8c forms the reverse-winding IVth coil 13 and the reverse-winding IXth coil 13. After returning to the reverse-winding IVth coil 13, the winding wire 12 is led into the seventh riser 8c. As described above, the coils 13 are wound around in the winding-around procedure as shown in FIG. 5. The coils 13 that are wound-around M times are thus formed two by two between the arbitrary slots 6d and have the same coil winding-around state as a conventional coil winding-around state.

Based on an arbitrary riser 8c (commutator segment 8b), the first winding wire 12A that is connected to a riser 8c that is adjacent thereto in a circumferential direction and the second winding wire 12B that is connected to a riser 8c that is adjacent thereto in another circumferential direction respectively form the coils (13a, 13b) that are series-connected and located at portions that are opposed to all magnetic poles (permanent magnets 3) that serve as the same magnetic poles. As described above, excellent magnetic balances are provided. As shown in FIGS. 4 and 6, with respect to a positional relationship between an arbitrary slot 6d from which the first winding wire 12A and the second winding wire 12B are led out, a riser 8c around which the led-out winding wires 12A and 12B are hooked from the arbitrary slot 6d, and another slot 6d into which the led-out winding wires 12B and 12A are led from the riser 8c so as to form the coil 13 that connects to an adjacent riser 8c, based on a position at which the riser 8c is formed, the slot 6d from which the first winding wire 12A and the second winding wire 12B are led out is set to be in a circumferential opposite direction with respect to the slot 6d into which the second winding wire 12B and the first winding wire 12A are led. Those slots 6d, from one of which the first winding wire 12A and the second winding wire 12B are led out and into another of which the second winding wire 12B and the first winding wire 12A are led, are also close to the riser 8c. When the winding wire 12 is hooked around the riser 8c, no winding wire 12 is congested between the riser 8c and the slot 6d. Furthermore, the winding wire 12 can be a so-called α-hooked so as to cross at a base end side of the riser 8c.

When the winding wire 12 is wound around in this way and a plurality of the coils 13 are formed so as to be conductive with an arbitrary riser 8c and another riser 8c adjacent to the arbitrary riser 8c and to be series-connected, the crossover 14 that leads a slot 6d that structures a coil 13 around another slot 6d that structures another coil 13 is led around at an axial base end side instead of at a side of the commutator 8 of the slot 6d (an axial leading end side). The regulating piece 11c is formed to a base end side insulator 11 that is provided at an axial base end side of the armature core 7. By leading the winding wire 12 around along an external diametrical side of the regulating piece 11c, the winding wire 12 is prevented from being shifted toward an inner diametrical side, i.e., toward a side of the armature shaft 5 from a side of the regulating piece 11c.

The risers 8c are formed in a shape that extends so as to project diametrically. The winding wire 12 that is hooked around the risers 8c is conductive by fusing. From an axial leading end and a base end side, a fusing device is inserted so as to be perpendicular to the risers 8c that diametrically extends and projects. While front and rear surfaces of the risers 8c are sandwiched by the fusing device, the fusing is carried out. At an axial base end side, the insulator 11 in which the regulating piece 11c is formed so as to be at an external diametrical side of the risers 8c is provided to the armature core 7. Because of the regulating piece 11c, no crossover 14, which is led around from a coil 13 to another coil 13, is apt to be wound toward an inner side from the regulating piece 11c. Smooth and easy fusing can thus be achieved.

In the present embodiment structured as specified above, the yoke 2 comprises four poles. When the winding wire 12 is wound around the armature 4, the commutator segments 8d to be provided to the armature 4 are twenty pieces, and the slots 6d to be formed at an outer periphery of the armature core 7 are ten pieces. The coils 13 comprises the first winding wire 12 to be conductive with the commutator segment 8b adjacent thereto in the circumferential direction and the second winding wire 12 to be conductive with another commutator segment 8b adjacent thereto in another circumferential direction based on the arbitrary commutator segment 8b. The coils 13 face with each other so as to be opposed to different poles. One coil is wound-around as the forward-winding coil 13 and another the reverse-winding coil 13. The coils 13 are also formed two by two at portions opposed to all the permanent magnets 3. Magnetic balances are thus further improved. Centrifugal whirling because of torque ripple or the like can also be reduced. As a result, lower-vibration and lower-noise rotary electric devices with superior performance can be provided.

Furthermore, in the first embodiment, the plurality of coils 13 are formed such that the winding wire 12 that is conductive with another riser 8c adjacent thereto in the circumferential direction from the arbitrary riser 8c is wound around between the slots 6d opposed to the same magnetic poles. The winding wire 12 is led out in both circumferentially directions of the riser 8c and such that both the slots 6d are close to the riser 8c with respect to the positional relationship between the arbitrary slot 6d from which the winding wire 12 is led out, the riser 8c around which the led-out winding wire 12 is hooked from the arbitrary slot 6d, and another slot 6d into which the led-out winding wire 12 is led from the riser 8c. Moreover, this state is kept regularly. The winding wire 12 can thus be prevented from being congested between the risers 8c (commutator 8) and the slots 6d (armature core 7). The winding wire 12 is also prevented from being thickened. As a result, winding the winding wire 12 can be easy. Moreover, because the winding wire 12 can easily be α-hooked, fixation of the winding wire 12 to the risers 8c is simple and further firm. Smooth fusing can thus be achieved.

Moreover, because the plurality of the coils 13 are formed, which are conductive with the pair of risers 8c, the winding wire 12 is thus be led around at an end of the slot 6d. In this embodiment, especially, the winding wire 12 is led around at an end that is opposite to a portion at which the commutator 8 of the slots 6d is disposed. The winding wire 12 can be prevented further from being congested between the commutator 8 and the armature core 7. The armature 4 can thus be provided with high reliability.

Figure 7:
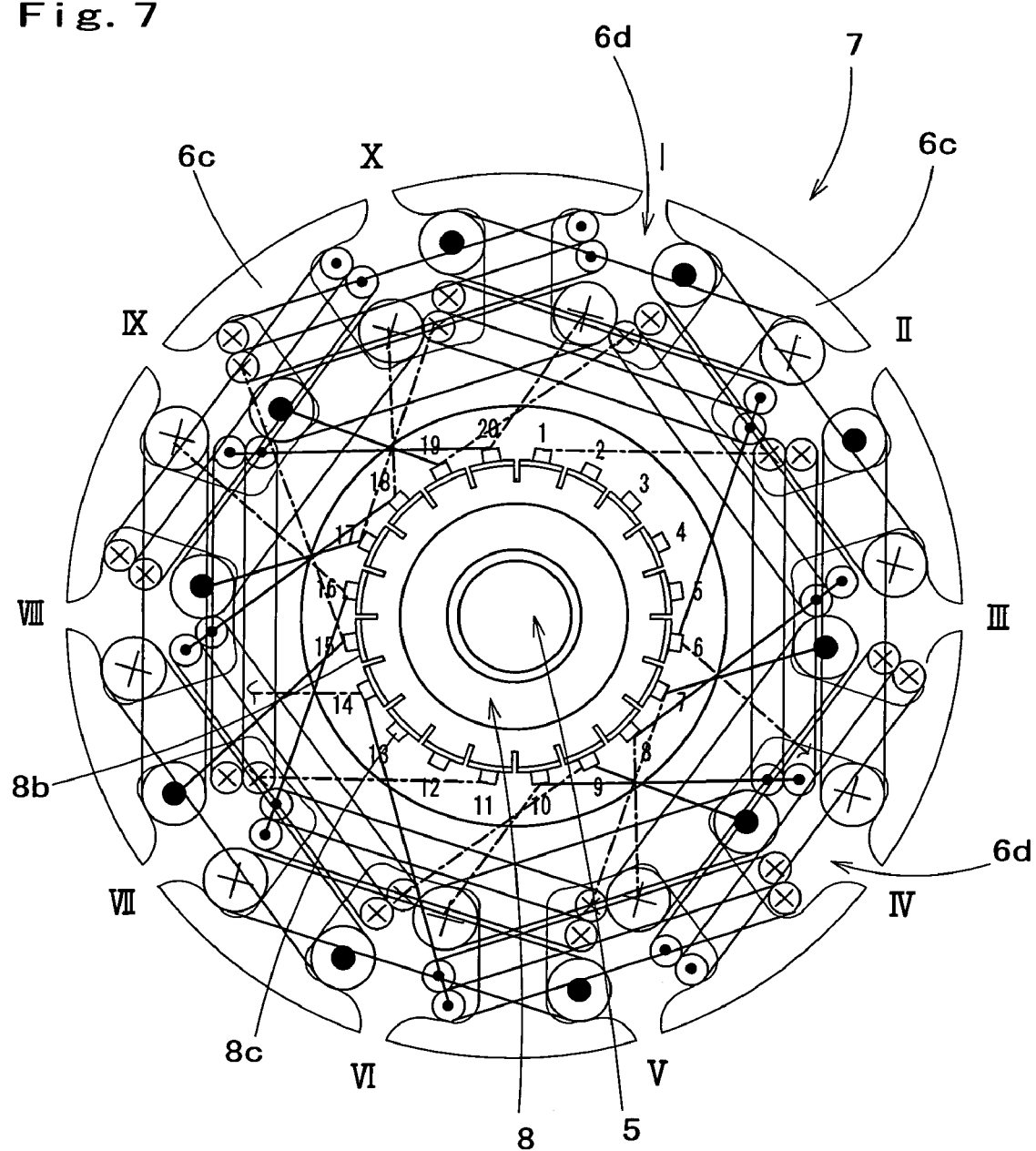
FIG. 7 is a front sectional view of an armature showing coils of a second embodiment that are wound-around.

The present disclosure is not limited to the above-described embodiment and can be structured as a second embodiment shown in FIGS. 7 and 8. An electric motor 1 of the second embodiment is structured as the same electric motor of the first embodiment, which includes four poles, ten slots 6d, and twenty commutators segments 8b. Respective coils 13 are formed as the total winding number is M. A first winding wire 12 that is hooked around a first riser 8c and led into a IInd slot 6d is the same as the first embodiment. Between the IInd and a IVth slots 6d that interpose a IIIrd slot 6d therebetween, the winding wire 12 is wound-around M/2-0.5 times when M is an odd number, and M/2-1 or M/2 times when M is an even number, so that a forward-winding IIIrd coil 13 is formed.

Subsequently, the winding wire 12 is led out to an axial base end side (of the armature shaft 5) (a side opposite to the commutator 8) of the IInd slot 6d so as to form a crossover 14 at a base end side from the IInd slot 6d to a IXth slot 6d. The winding wire 12 is then led out to a leading end side of the IXth slot 6d. Between the IXth and a VIIth slots 6d that interpose a VIIIth slot 6d therebetween, the winding wire 12 is then wound-around M/2-0.5 times when M is an odd number, and M/2 or M/2-1 times when M is an even number, so that a forward-winding VIIIth coil 13 is formed. The winding wire 12 that is led to a leading end side out of the IXth slot 6d is then hooked around a twentieth riser 8c.

A second winding wire 12 that is led out of the twentieth riser is then led into a Ist slot 6d, wound M times between the Ist and a IXth slots 6d that interpose a Xth slot 6d therebetween so as to form a reverse-winding Xth coil, and led out to a leading end side of the IXth slot 6d so as to be hooked around a nineteenth riser 8c. The second winding wire 12 forms only one coil 13 to be conductive with a pair of commutator segments 8b.

In the second embodiment as well, the first winding wire 12 is wound-around such that the coils 13 are wound around so as to be opposed to all the same magnetic poles. Magnetic balances are thus excellent. Based on the risers 8c with which the first and the second winding wires 12 are conductive, the slot 6d from which the first winding wire 12 is led out and another slot 6d into which the second winding wire 12 is led are circumferentially located in both directions. No winding wires are congested between the risers 8c and the slots 6d. The winding wires can be prevented from being thickened. Easy winding can thus be achieved. In addition, the winding wire 12 can easily be α-hooked around and firmly be fixed to the riser 8c. Smooth fusing can thus be achieved.

Next, a third embodiment shown in FIG. 9 will be described. In this embodiment, commutator segments 8b are twice as many as the slots 6d. The commutator segments 8b that are positioned so as to be diametrically opposed to one another are equivalent. A coil 13 is formed such that another commutator segment 8b that is adjacent to an arbitrary commutator segment 8b is replaced with an equivalent commutator segment 8b. A total winding number of the respective coils 13 being as M, a first winding wire 12 that is led from an eleventh riser 8c that is equivalent to a first riser 8c is wound-around M/2-0.5 times when M is an odd number and M/2-1 or M/2 times when M is an even number between a VIIth and a IXth slots 6d that interpose a VIIIth slot 6d therebetween, so that a VIIth forward-winding coil 13 is formed.

After that, the winding wire 12 is led out to an axial base end side (of the armature shaft 5) (a side opposite to the commutator 8) of a VIIth slot 6d, and is led around from the VIIth slot 6d to a base end side of a IVth slot 6d, so that a crossover 14 is formed. The winding wire 12 is then led out to the leading end side of the IVth slot 6d. Between the IVth and a IInd slots 6d that interpose a IIIrd slot 6d therebetween, the winding wire 12 is then wound-around M/2-0.5 times when M is an odd number, and M/2 or M/2-1 times when M is an even number in order to form a IIIrd forward-winding coil 13. The winding wire 12 is then led around to a base end side of the IXth slot 6d from a base end side of the IInd slot 6d so as to be hooked around a 20th riser 8c, which has been led out to a leading end side of the IXth slot 6d.

A second winding wire 12 that is led out of the 20th riser is then led into a Ist slot 6d. Between the Ist and the IXth slots 6d that interpose a Xth slot 6d therebetween, the second winding wire 12 is then wound-around M/2-0.5 times when M is an odd number and M/2-1 times when M is an even number so as to form a reverse-winding Xth coil 13. The second winding wire 12 that is led out to a base end side of the Ist slot 6d is then led around at a base end side of the IVth slot 6d so as to form the crossover 14. Between the IVth and a VIth slots 6d that interpose a Vth slot 6d therebetween, a reverse-winding Vth coil 13 is wound around. The second winding 12 that is led out to a leading end side of the IVth slot 6d is then hooked around a 9th riser 8c that is equivalent to a 19th riser 8c. The following winding wire 12 is wound-around in accordance with an order shown in FIG. 9.

In the third embodiment as well, the first and the second winding wires 12 are respectively wound-around such that the coils 13 are wound around so as to be opposed to all magnetic poles that serve as the same magnetic poles. Magnetic balances are thus excellent. Moreover, in this embodiment as well, based on the risers 8c with which the first and the second winding wires 12 are conductive, the slot 6d from which the first winding wire 12 to be conductive with a riser 8c that is equivalent to another riser 8c that is adjacent thereto in a circumferential direction is led out and another slot 6d into which the second winding wire 12 to be conductive with a riser 8c that is equivalent to another riser 8c that is adjacent thereto in another circumferential direction is led are circumferentially located in both directions. No winding wires are thus congested between the risers 8c and the slots 6d. The winding wires are also prevented from being thickened. As a result, easy winding is achieved. Furthermore, the winding wire 12 can easily be α-hooked around and firmly be fixed to the riser 8c. Smooth fusing can thus be achieved.

The present disclosure is useful for an armature in a rotary electric device to be mounted on a vehicle or the like and a method for manufacturing the same. When winding wires are wound around the armature, twenty pieces of commutator segments and ten pieces of slots are provided to the armature. Adjacent coils are respectively opposed to different poles. The winding wires are wound around in a forward-winding direction and in a reverse-winding direction. Magnetic balances are improved further. The winding wires are also prevented from being congested among the commutator segments and the slots. As a result, the winding wires are simply and firmly fixed to the commutator segments.

What is claimed is:

1. A rotary electric device comprising:
   an armature with a plurality of commutator segments;
   a plurality of coils that are formed such that winding wires to be conductive with adjacent commutator segments are wound a predetermined winding number between arbitrary slots of the armature, with the plurality of coils formed circumferentially on the armature; and
   a yoke that pivotally supports the armature, with the yoke including at least two sets of magnetic poles, wherein:
   a number of slots is set to be half a number of commutator segments,
   a first winding wire of the winding wires to be conductive with an arbitrary commutator segment and a first commutator segment that is adjacent to the arbitrary commutator segment in one direction circumferentially is wound around slots that are opposed to one magnetic pole so as to be in a forward-winding direction,
   a second winding wire of the winding wires to be conductive with the arbitrary commutator segment and a second commutator segment that is adjacent to the arbitrary commutator segment in another direction circumferentially is wound around slots that are opposed to another magnetic pole so as to be in a reverse-winding direction,
   at least one of the first winding wire and the second winding wire is wound around slots that are opposed to all magnetic poles serving as a same magnetic pole in a predetermined winding direction so as to correspond to the predetermined winding number as a total winding number between respective slots, so that the plurality of coils are formed, and
   a slot from which the first winding wire is led out and a slot into which the second winding wire is led are located circumferentially at both sides of the commutator segments with which the first winding wire and the second winding wire are conductive.

2. The rotary electric device according to claim 1, wherein the first winding wire or the second winding wire that is wound around the slots that are opposed to all the magnetic poles serving as the same pole so as to form the plurality of coils is led around at an end that is opposite to a side at which the commutator segments of the slots are installed.

3. A method for manufacturing an armature with a plurality of commutator segments in a rotary electric device including a plurality of coils that are formed such that winding wires to be conductive with adjacent commutator segments are wound a predetermined winding number between arbitrary slots of the armature, with the plurality of coils formed circumferentially on the armature, the method for manufacturing the armature comprising the steps of:
   setting a number of slots to be half of a number of commutator segments;
   winding a first winding wire of the winding wires to be conductive with an arbitrary commutator segment and a first commutator segment that is adjacent to the arbitrary commutator segment in one direction circumferentially around slots that are opposed to one magnetic pole so as to be in a forward-winding direction;
   winding a second winding wire of the winding wires to be conductive with the arbitrary commutator segment and a second commutator segment that is adjacent to the arbitrary commutator segment in another direction circumferentially around slots that are opposed to another magnetic pole so as to be in a reverse-winding direction;
   winding at least one of the first winding wire and the second winding wire around slots that are opposed to all magnetic poles serving as a same magnetic pole in a predetermined winding direction so as to correspond to the predetermined winding number as a total winding number between respective slots, so that the plurality of coils are formed; and
   circumferentially locating a slot from which the first winding wire is led out and a slot into which the second winding wire is led at both sides of the commutator segments with which the first winding wire and the second winding wire are conductive.

4. The method for manufacturing the armature of the rotary electric machine according to claim 3, wherein the first winding wire or the second winding wire that is wound around the slots that are opposed to all the magnetic poles serving as the same pole so as to form the plurality of coils led around at an end that is opposite to a side at which the commutator segments of the slots are installed.

5. The rotary electric device according to claim 1, wherein the slots are formed at an armature core that is fitted with an armature shaft.

6. The method for manufacturing the armature of the rotary electric machine according to claim 3, wherein the slots are formed at an armature core that is fitted with an armature shaft.

7. An armature comprising:
   an armature shaft;
   an armature core that includes a plurality of slots and is fitted with the armature shaft; and
   a plurality of commutator segments, wherein:
   a plurality of coils are formed such that winding wires to be conductive with adjacent commutator segments are wound a predetermined winding number between arbitrary slots of the armature core, with the plurality of coils formed circumferentially on the armature, a number of slots is set to be half a number of commutator segments, a first winding wire of the winding wires to be conductive with an arbitrary commutator segment and a first commutator segment that is adjacent to the arbitrary commutator segment in one direction circumferentially is wound around slots that are opposed to one magnetic pole so as to be in a forward-winding direction, a second winding wire of the winding wires to be conductive with the arbitrary commutator segment and a second commutator segment that is adjacent to the arbitrary commutator segment in another direction circumferentially is wound around slots that are opposed to another magnetic pole so as to be in a reverse-winding direction, at least one of the first winding wire and the second winding wire is wound around slots that are opposed to all magnetic poles serving as a same magnetic pole in a predetermined winding direction so as to correspond to the predetermined winding number as a total winding number between respective slots, so that the plurality of coils are formed, and a slot from which the first winding wire is led out and a slot into which the second winding wire is led are located circumferentially at both sides of the commutator segments with which the first winding wire and the second winding wire are conductive.

8. The armature according to claim 7, wherein the first winding wire or the second winding wire that is wound around the slots that are opposed to all the magnetic poles serving as the same pole so as to form the plurality of coils is led around at an end that is opposite to a side at which the commutator segments of the slots are installed.

* * * * *